March 10, 1953　　　　E. L. MORRIS　　　　2,630,577
WASTE TREATING AND DISPOSAL UNIT
Filed Nov. 16, 1949　　　　　　　　　2 SHEETS—SHEET 1
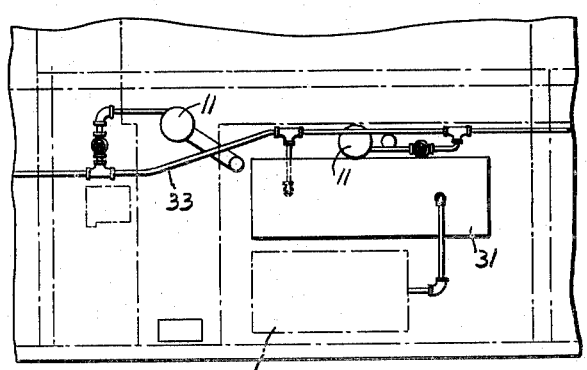
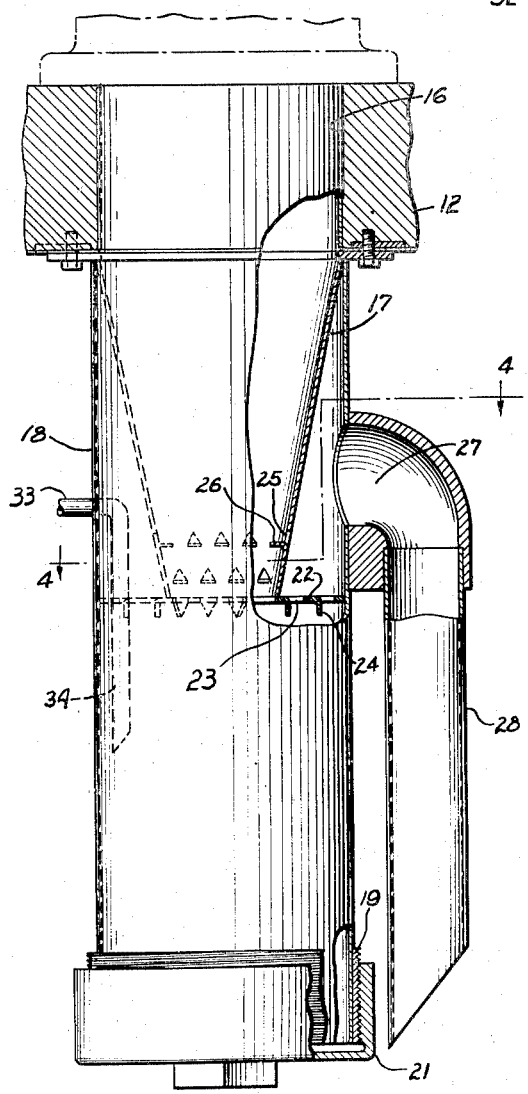
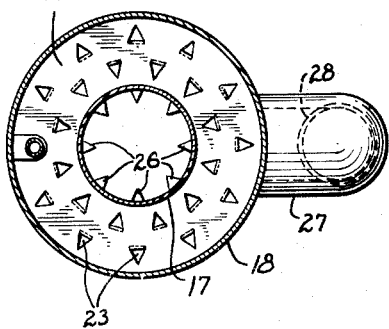
INVENTOR.
Edgar L. Morris
BY
atty.

March 10, 1953  E. L. MORRIS  2,630,577
WASTE TREATING AND DISPOSAL UNIT
Filed Nov. 16, 1949  2 SHEETS—SHEET 2
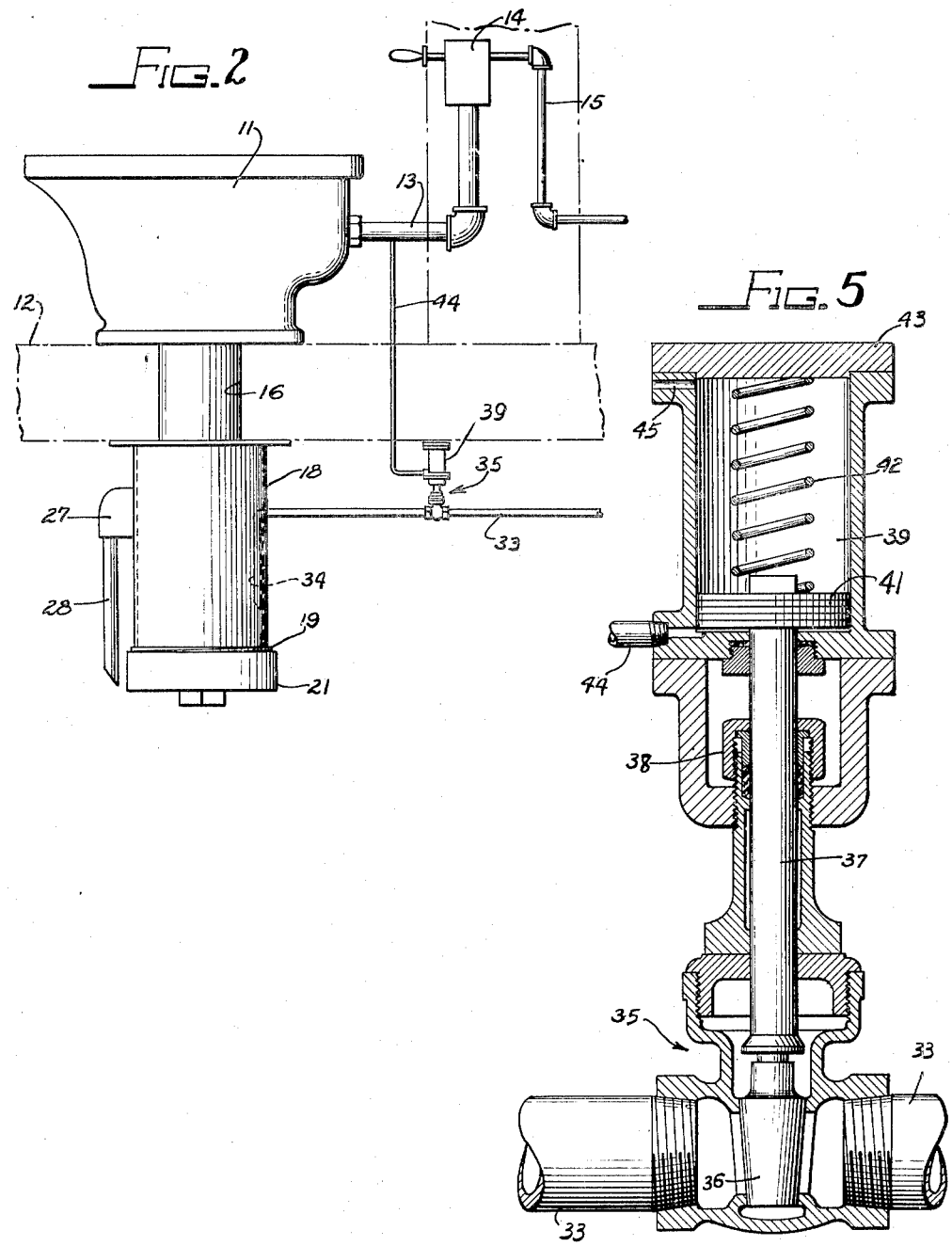
INVENTOR.
Edgar L. Morris Patented Mar. 10, 1953

2,630,577

UNITED STATES PATENT OFFICE 2,630,577

WASTE TREATING AND DISPOSAL UNIT

Edgar L. Morris, Chicago, Ill.

Application November 16, 1949, Serial No. 127,746

15 Claims. (Cl. 4—8)

The invention relates to improvements in waste treating and disposal apparatus and is more particularly concerned with a sewage disposal and purifying system.

The system embodying the features of the present invention is shown and described as being installed in a mobile unit such as, for example, a railway car. It is to be understood, however, that it may be installed in other types of mobile units and in buildings without modification. Its use in mobile units is, however, particularly advantageous because it avoids the discharge of harmful waste along right of ways, in terminals and on highways and, when installed in aircraft, the retention tanks are kept clean and sanitary. It is, therefore, an object of the invention to provide a novelly constructed, universally applicable system for waste disposal.

Another object is to provide a waste treating and disposal unit with a novel waste receiver having associated means effective to discharge a metered quantity of chemicals thereinto each time waste is delivered to the receiver.

Another object is to provide a rugged waste treating and disposal system which is not costly or difficult to install in existing waste units and which is highly efficient and entirely automatic in its operation.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow:

In the drawings:

Fig. 1 is a schematic fragmentary plan view of a railway car showing the improved waste treating and disposal units installed therein.

Fig. 2 is a side elevational view of one of the waste treating and disposal units shown in Fig. 1, the railway car being illustrated in broken lines.

Fig. 3 is an enlarged elevational view of the disposal unit showing parts thereof in section.

Fig. 4 is a horizontal sectional plan view, taken substantialy on line 4—4 of Fig. 3.

Fig. 5 is an enlarged detail view of the chemical control valve showing parts thereof in section.

The improved waste treating and disposal unit illustrated in the accompanying drawings is shown as installed in a railway car. In such an installation, each bowl 11 is fitted with a complete waste treating element and is suitably connected through conventional piping with sources of water and chemical supply. As shown, the bowl 11, mounted upon the floor 12 of the railway car, has the conventional flush inlet line 13 connected thereto. A conventional flush valve 14 is installed in said line and is connected, as by a pipe 15, with the source of water supply. Because this arrangement is conventional, it is not believed to be necessary to enter into an elaborate discussion of the structure and function of the flush valve, it being apparent that when said valve is actuated manually water is discharged under pressure through the flush line 13 and into the bowl 11.

Discharge from the bowl 11 passes downwardly through a sleeve 16, provided therebeneath in the floor 12 and flows through a hopper or dam 17 secured in axial alignment therewith and depending downwardly below said floor. The hopper 17 is frustro-conical and has its smaller diameter located at its lowermost end. A receiver 18 having the form of a cylindrical shell is telescoped over the hopper 17 and secured to the floor. The receiver 18 is, however, considerably longer than the hopper 17 and, therefore, extends some distance below the bottom end of the hopper.

The lower end of the receiver 18 preferably is provided with an externally threaded collar 19 adapted to receive in threaded engagement therewith a cap 21. The cap 21 serves to close the bottom of the receiver whereby the portion of the receiver depending below the bottom end of the hopper constitutes a receptacle for waste. When inspection or cleaning is necessary or desirable, the cap 21 may be easily and quickly removed.

A circular baffle 22 is located in the circular area between the wall of the receiver 18 and the bottom perimeter of the hopper 17. It may be permanently secured as by welding. The baffle 22 has a plurality of apertures 23 therein, each preferably formed by striking triangular-shaped prongs 24 downwardly out of the plane of the baffle 22. Similar triangular-shaped openings 25 are provided in the lower region of the hopper 17. These triangular openings also preferably are formed by striking the metal out of the hopper wall inwardly to define prongs 26. The prongs 24 and 26 afford means for tearing or otherwise breaking up solids passing downwardly through the hopper 17 or upwardly through the circular baffle 22.

Insofar as the device has been described, waste and water discharged from the bowl 11 flow into the lower portion of the receiver 18 and subsequently overflow through a vent discharge 27. The vent discharge 27 is, as is best shown in Fig. 3, located at or above the top plane of the openings 26 in the hopper 17. This positioning of the vent 27 insures the maintenance of a water head at all times between the contents of the receiver and the bowl. The discharge vent 27 includes a downwardly extending pipe 28 open at its lower end. This pipe preferably is of a length substantially equal to or greater than the length of the receiver 18 to prevent the discharge through the vent from accumulating on the exterior surface of the receiver.

The present invention embodies means to chemically treat waste deposited into the receiver 18 prior to its discharge through the discharge vent 27. To this end, means is provided whereby a predetermined quantity of chemicals is discharged into the receiver each time the flush valve 14 is actuated. It should be understood that any suitable chemicals may be used, either in crystal or liquid form. Such chemicals as are used should be capable of effecting the necessary or desirable degeneration, and otherwise rendering the waste free of harmful germs and bacteria. In addition, suitable anti-freeze solutions may be used therein.

Injection of such chemicals may be accomplished by providing a suitable container 31 in the railway car, which container is connected with the usual or auxiliary air pressure tank 32 so as to maintain the chemicals under sufficient pressure to insure their delivery to the various receivers as required. As best shown in Fig. 2, a pipe line 33 leading from the container 31 is suitably connected with an injector 34 mounted within the receiver 18. A valve 35 is arranged in the line 33. This valve normally is closed to prevent the free flow of chemicals into the receiver.

Upon referring to Fig. 5, the valve 35 includes a valve element 36 having a stem 37 thereon, which stem extends upwardly through the valve packing gland 38 and into a cylinder 39. A piston 41, mounted in the cylinder 39, is fixedly secured to the upper end of the stem 37. A coil spring 42, located in the cylinder between the piston 39 and the closed cylinder end 43, normally urges the piston into the lowermost position illustrated so as to maintain the valve 36 closed. A pipe 44 is suitably connected in a tapped inlet provided in the cylinder 39 so as to communicate with the lower portion thereof below the piston 41. This pipe has its other end in communication with the flush line 13. A bleeder port 45 is provided at the upper end of the cylinder 38 for a purpose to be understood as the description proceeds.

When the flush valve 14 is actuated to permit water under pressure to flow through the flush line 13 into the bowl 11, a quantity of such water will enter the pipe line 44 and flow into the space beneath the piston 41. The entrance of water under pressure into the cylinder 39 will raise the piston 41 and consequently open the valve 35 to thereby permit chemicals to flow therethrough into the receiver 18. As soon as the pressure of the water flowing in the flush line 13 falls below a minimum predetermined by the tension of the spring 42, the piston returns to its initial lowermost position and closes the chemical flow control valve.

The waste treating and disposal unit described hereinabove is entirely automatic in operation and requires little or no maintenance. Although it has been described as being installed in a railway car, it should be understood that it may be utilized in any waste disposal system without requiring material alteration in the construction thereof.

Although a preferred embodiment of the invention has been shown in the accompanying drawing and described hereinabove, it should be understood that the invention is capable of embodying a wide variety of modifications in structure without departing from the spirit of the invention or the scope of the appended claims.

I claim:

1. A waste treating and disposal unit comprising a bowl, valved means effective to deliver water to said bowl, a hopper communicating with and depending from the bottom of said bowl, a casing surrounding said hopper and forming a receiver tank beneath said hopper and into which waste passing from the hopper is deposited, an injection tube in said receiver tank, means connecting said tube with a supply of chemicals, a valve normally shutting off the supply of chemicals to said injection tube, valve actuating means, and a conduit connecting said valve actuating means with the water delivery means to said bowl so that when the water control valve is open water pressure in said conduit will operate the valve actuating means to open the chemical control valve momentarily.

2. A waste treating and disposal unit as described in claim 1, in which the receiver has a discharge vent.

3. A waste treating and disposal unit as described in claim 1, in which the receiver has a discharge vent and a baffle located in the path of treated waste and water flowing thereto.

4. A waste treating and disposal unit comprising a bowl, a pipe line connecting said bowl with a source of water supply, a normally closed valve in said pipe line, a funnel shaped dam beneath and constituting the outlet for said bowl, a receiver tank telescoped over said dam and depending below the lower end thereof, a baffle in said receiver tank surrounding the lower end of the dam, said baffle and the lower portion of the dam having perforations therein, a discharge vent communicating with the receiver above said baffle, an injection nozzle in said receiver, a pipe line connecting said nozzle with a source of chemical supply, a normally closed valve in said chemical pipe line, said valve including actuating means, a water by-pass between the water pipe line and the actuating means, said by-pass connecting with the water pipe line in advance of the valve in said line and being adapted to conduct water under pressure to said actuating means when the control valve is opened so as to open the chemical line valve and admit chemicals to said receiver.

5. In a waste treating and disposal unit including a bowl having a valve controlled water flush line connected therewith, a receiver for the discharge from said bowl, a pressurized container for chemicals, an injector in said receiver, a pipe line connecting said injector with said container, a normally closed valve in said pipe line, means to actuate said valve, means connecting the flush line with said valve actuating means so as to cause said valve to open when the bowl is flushed, and a discharge for said receiver.

6. A waste treating and disposal unit comprising a bowl, means including a flush valve operable to flush the bowl, a funnel shaped dam beneath said bowl and through which the bowl discharge passes, a discharge receiver surrounding and extending below said dam, a baffle located in the receiver surrounding the lower end of the dam, an outlet in the receiver above said baffle, said baffle being perforated to permit treated waste to flow to the outlet, an inlet to admit chemicals into the receiver, and means effective when the flush valve is actuated to discharge chemicals through said inlet.

7. A waste treating and disposal unit as described in claim 6, in which the lower portion of the dam is perforated.

8. A waste treating and disposal unit as described in claim 6, in which the lower portion of the dam is perforated and tearing projections are provided adjacent the perforations in both the dam and baffle.

9. A waste treating and disposal unit as described in claim 6, in which the portion of the dam below the outlet is perforated.

10. A waste treating device adapted to be placed beneath a closet bowl for receiving waste after the same passes through the bowl, comprising a dam, the lower portion of which is perforated, a discharge receiver surrounding and extending below said dam, a baffle located in the receiver surrounding the lower end of the dam, said baffle being perforated and provided with projections adjacent the perforations for disintegrating solids and tearing paper.

11. In a waste treating and disposal unit comprising a bowl, a discharge conduit extending from the bottom of the bowl, a frustro-conical hopper communicating with said conduit and extending therebelow, a casing surrounding said hopper and forming a waste receiving tank therebelow, material disintegrating means at the bottom of said hopper, a discharge tube extending from said casing from a point above the bottom of the hopper, means for flushing said bowl, means for conveying chemicals to said receiving tank including a valve and means responsive to the flushing of said tank for opening said valve.

12. In a waste treating and disposal unit comprising a bowl, a frustro-conical hopper having communication with said bowl and extending downwardly therefrom with its smallest diameter at the bottom, a casing surrounding said hopper and forming a waste receiving tank therebelow, a perforated baffle having projecting prongs at the bottom of the hopper and extending across said casing, the lower end of said hopper having apertures with prongs, the prongs on said baffle and hopper forming waste disintegrating means, a removable cap upon the bottom of the casing and means for flushing said bowl and supplying chemicals to said waste receiving tank.

13. In a waste treating and disposal unit comprising a bowl, a tubular casing adapted for attachment below said bowl, a frustro-conical hopper in said casing and having its mouth secured adjacent the top of said casing and extending substantially to the medial part of said casing, the lower portion of said casing forming a waste receiving tank, a baffle in said casing at the bottom of said hopper, said baffle and hopper having material disintegrating means, a removable closure at the bottom of the casing, and means for flushing said bowl and supplying chemicals to said waste receiving tank.

14. A waste treating and disposal unit comprising a bowl, means including a flush valve operable to flush the bowl, a dam beneath said bowl and through which the bowl discharge passes, a discharge receiver surrounding and extending below said dam, an outlet in the receiver, and a baffle between the dam and the outlet, said baffle being perforated to permit waste to flow to the outlet.

15. A waste treating and disposal unit comprising a bowl, means including a flush valve operable to flush the bowl, a dam beneath said bowl and through which the bowl discharge passes, a discharge receiver surrounding and extending below said dam, an outlet in the receiver, a baffle between the dam and the outlet, said baffle being perforated to permit waste to flow to the outlet, an inlet to admit chemicals into the receiver, and means effective when the flush valve is actuated to discharge chemicals through said inlet.

EDGAR L. MORRIS.

REFERENCES CITED

The following references are of record in the file of this patent:

UNITED STATES PATENTS

| Number | Name | Date |
|---|---|---|
| 1,005,075 | Rosenstock | Oct. 3, 1911 |
| 1,321,357 | Bates | Nov. 11, 1919 |
| 1,583,282 | Denny | May 4, 1926 |
| 1,607,257 | Gaulke | Nov. 16, 1926 |
| 1,996,325 | Cox | Apr. 2, 1935 |
| 2,102,430 | McLeod | Dec. 14, 1937 |